United States Patent

[11] 3,585,754

| [72] | Inventors | Dean A. Cortopassi<br>11292 N. Alpine Road, Stockton, Calif. 92505;<br>Frederick L. Hill, San Joaquin, Calif. |
|---|---|---|
| [21] | Appl. No. | 801,625 |
| [22] | Filed | Feb. 24, 1969 |
| [45] | Patented | June 22, 1971 |
| [73] | Assignee | said Cortopassi, by said Hill |

[54] ROW CROP PLANT TRAINER
4 Claims, 4 Drawing Figs.

[52] U.S. Cl. .................................................. 47/1, 56/327
[51] Int. Cl. ....................................................... A01d 45/00, A01b 39/28
[50] Field of Search ........................................... 47/1; 172/81, 489, 510; 56/119, 327

[56] References Cited
UNITED STATES PATENTS

| 518,363 | 4/1894 | Brookens ..................... | 172/81 X |
| 888,348 | 5/1908 | Nichols ........................ | 172/510 |
| 1,030,475 | 6/1912 | Manson ....................... | 172/489 |
| 2,748,535 | 6/1956 | Skromme et al. ............. | 47/9 |
| 3,277,605 | 10/1966 | O'Brien ....................... | 47/1 |

*Primary Examiner*—Robert E. Bagwill
*Attorney*—Webster & Webster

ABSTRACT: A machine—for advance along a row crop on a longitudinal soil bed having irrigation furrows at the sides thereof—operative, through the medium of transversely spaced, vertical-axis, ground-driven drums having circumferentially spaced pegs depending from the lower end thereof, and a horizontal flared-end plant-driven top roller spanning between such drums, to engage runners growing into the furrows from plants on the soil bed and to then sweep such runners onto the bed and press-tuck them into the mat of plants thereon, while at the same time compacting such mat in its entirety.

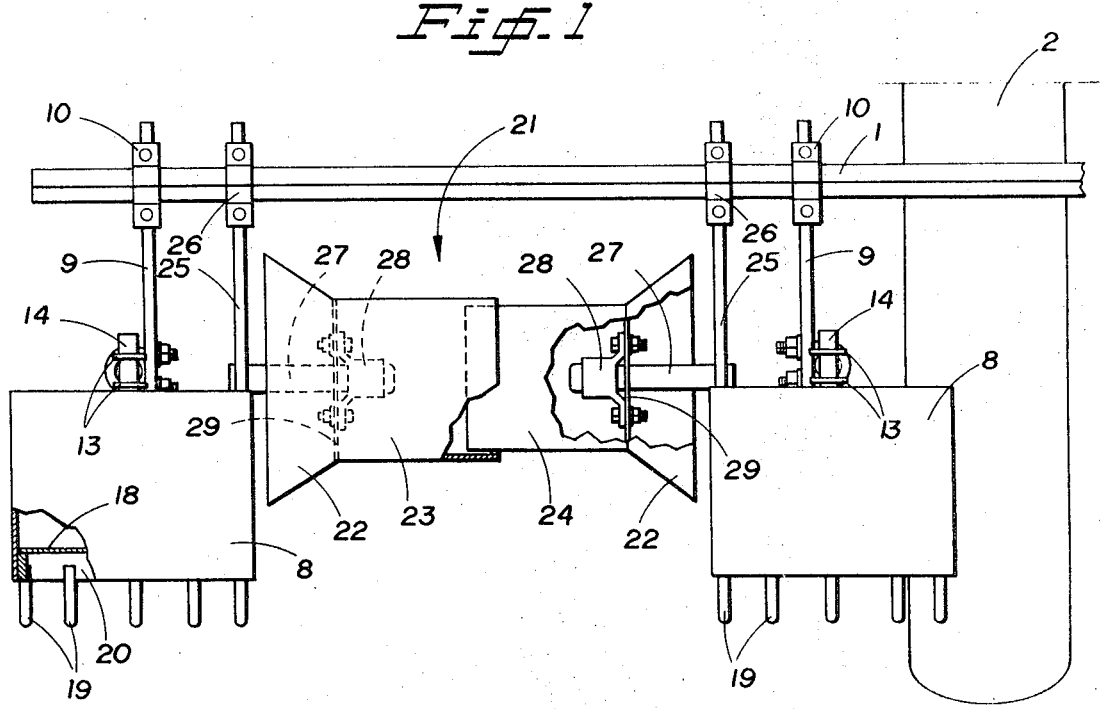
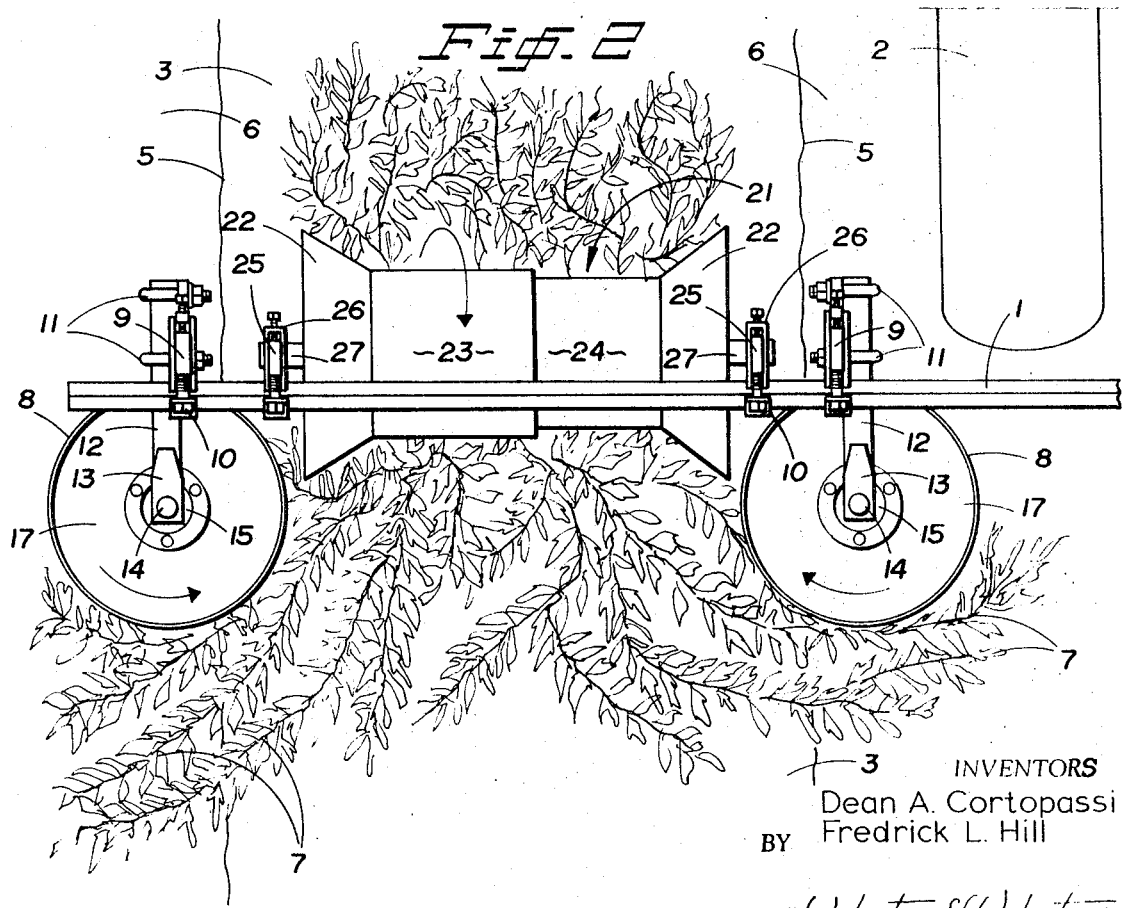

PATENTED JUN 22 1971

ROW CROP PLANT TRAINER

BACKGROUND OF THE INVENTION

When tomatoes, or other row crops which have plant runners, are grown on a soil bed bordered at the sides by irrigation furrows, such runners grow into said furrows, and which is most undesirable. More particularly, plant runners so growing not only interfere with proper irrigation flow in the furrows but if permitted to remain therein until harvest, result in a substantial crop loss due to crushing of mature fruit on said runners by the harvester wheels running in the furrows. The present invention was conceived in seeking a solution to such problem and constitutes improvements over the machine shown in the copending application of Dean A. Cortopassi, SER. No. 748, 060, filed July 26, 1968 now U.S. Pat. No. 3,526,055

SUMMARY OF THE INVENTION

The present invention provides, as a major object, a row crop plant trainer which includes novel, tractor-mounted mechanism operative, as 75; machine advances, to engage runners growing into side furrows from plants on a longitudinal soil bed, and to then sweep such runners onto the soil bed and press-tuck them into the mat of plants thereon, whereby to prevent return of the runners to the furrows; said mechanism also functioning to compact such mat in its entirety. By so press-tucking the runners, and compacting the entire plant mat, not only is there avoided the aforesaid problems arising from the runners remaining in the furrows, but additionally the machine harvesting of the crop is substantially facilitated.

The present invention provides, as an variants object, a row crop plant trainer, as in the preceding paragraph, wherein said mechanism is tractor supported and includes transversely spaced, vertical-axis, ground-driven drums having circumferentially spaced pegs depending from the lower end thereof; such drums being disposed to work along the shoulders of the soil bed in a fashion such that the pegs engage the runners extending into the furrows and together with the drums sweep such runners onto said soil bed whence the swept runners are press-tucked into the plant mat on such bed. The mechanism also includes a horizontal-axis, flared-end, plant-driven top roller spanning between the transversely spaced drums and disposed above the soil bed a distance such that said top roller not only assists in such press-tucking of the swept runners but also compacts the entire plant mat.

The present invention provides, as a further object, a row crop plant trainer which is designed for ease and economy of manufacture, and efficiency of operation.

The present invention provides, as a still further object, a practical, reliable, and durable row crop plant trainer and one which is exceedingly effective for the purpose for which it independently designed.

BRIEF DESCRIPTION OF THE DRAWINGS

FIG. 1 is a front elevation of the row crop plant trainer as tractor mounted; the view being partly broken away and partly in section.

FIG. 2 is a top plan view of the plant trainer as in operation.

DESCRIPTION OF THE PREFERRED EMBODIMENT

Figure 3:
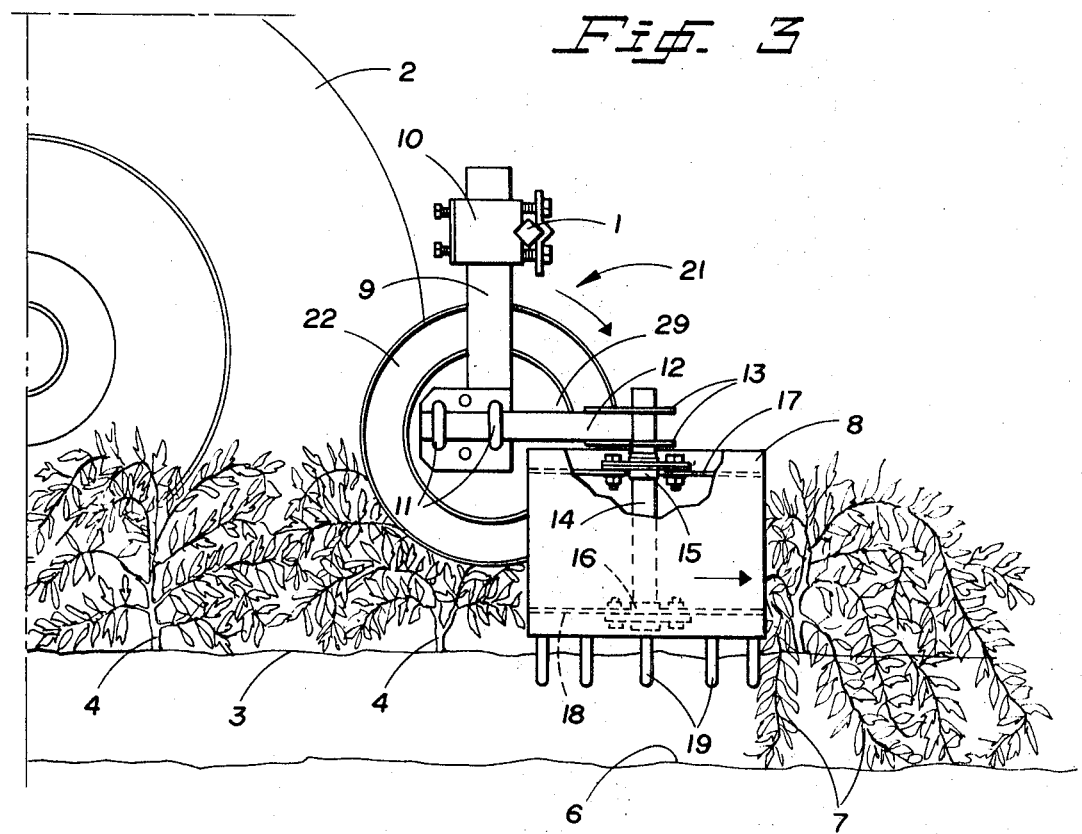
FIG. 3 is side elevation of the plant trainer as in operation.
Figure 4:
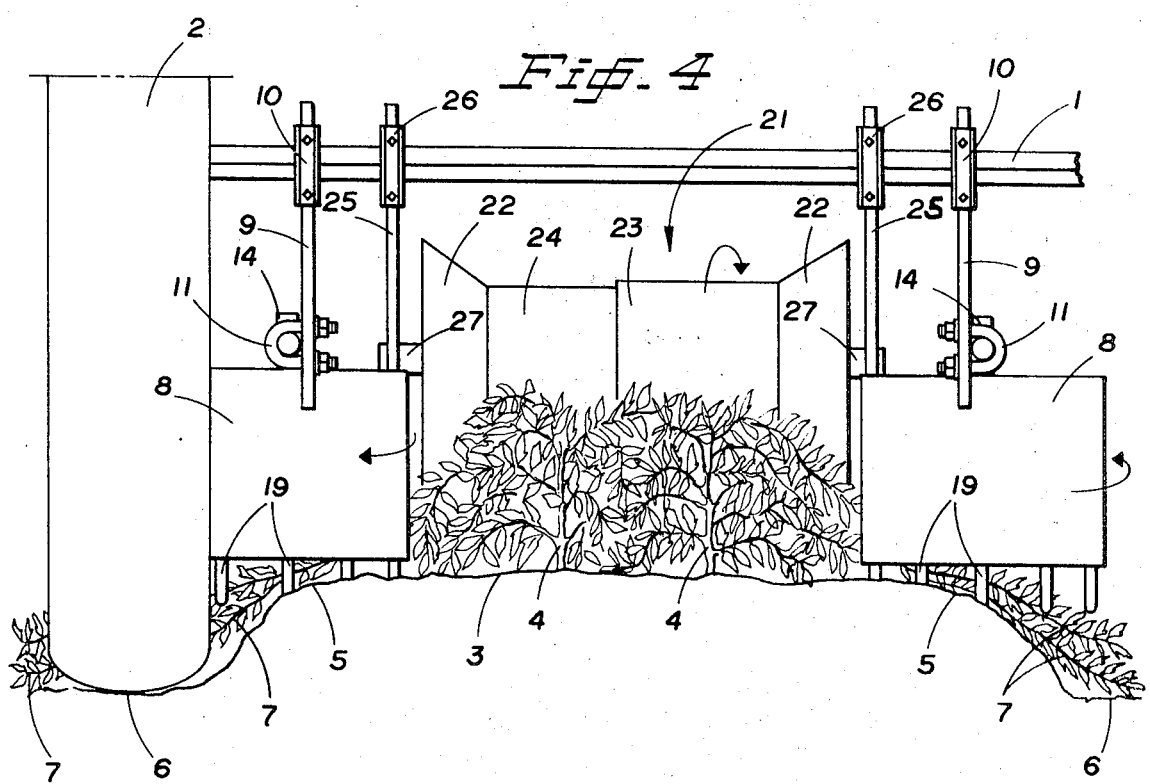
FIG. 4 is a rear end elevation of the plant trainer as in operation.

Referring now more particularly to the drawings and to the characters of reference marked thereon, the mechanism (which comprises the plant trainer) is tractor mounted by means of a transverse tool bar 1 which extends laterally outward from a tractor (not shown other than one wheel 2); the transverse tool bar 1 being disposed a distance above and spanning across the soil bed 3 on which a longitudinal row of plants 4 is growing. At the sides thereof and beyond its shoulders 5, the soil bed 3 is bordered by longitudinal irrigation furrows 6; the tractor wheel 2 running in one of such furrows.

In the normal growth of the plants 4, such as tomato plants, relatively long runners 7 grow into the furrows 6, posing the problems hereinbefore described.

A pair of upstanding, transversely spaced, rotary drums 8 are disposed so that they lie closely adjacent the sides of the row of plants 4, with the laterally outermost portion of each drum overhanging the related furrow 6, while the laterally innermost portion overhangs the corresponding shoulder 5 of the soil bed 3. Each such drum 8 is mounted in connection with the tool bar 1, in both vertically and laterally adjustable relation, by means of a standard 9 attached at its upper end portion to the tool bar 1 by a clamp 10; such standard being fitted at its lower end with clamps 11 which secure to said standard a short, forwardly projecting, rigid arm 12. By means of plates 13, each rigid arm 12 is attached, at its forward end, to the upper end of a vertical shaft 14; such shaft being fitted with upper and lower bearings 15 and 16 which, in turn, are secured to upper and lower attachment discs 17 and 18, respectively, included in the related drum 8.

Each of the rotary variant 8 is provided, at its lower end, with a row of circumferentially spaced, depending pegs 19; such pegs being fixed on a mounting band 20 inserted in and suitably secured to the lower end of the drum. While the pegs 19 of each drum 8 are relatively short, their depending dimension is such that, when the related drum 8 is set so that its lower end is adjacent but close to the surface of the soil bed 3, a number of such pegs on the laterally inner portion of the drum penetrate the soil of the bed at and adjacent the corresponding shoulder 5, thereof. Thus, as the machine advances, the drums 8, by virtue of the pegs 19 which penetrate the soil bed 3, are caused to rotate simultaneously and in a direction such that adjacent faces of the drums turn rearwardly. Also, the penetration of the soil bed 3 by the pegs 19 along the shoulders 5 of the soil bed 3 have a cultivating effect; the soil passing between the pegs and thus avoiding undesirable soil displacement.

However, the primary purpose of the depending pegs 19 is as follows:

As the drums 8 advance, and rotate in the directions noted, said depending pegs 19 successively engage the runners 7 and sweep them from the furrows 6 upwardly onto the soil bed 3, whence said runners are press-tucked by said drums into the mat of plants 4 on such soil bed.

With the runners 7 thus drawn out of the furrows 6 and press-tucked into the mat of plants 4 on the soil bed 3, such runners, because of their entanglement in such mat, normally do not return to the furrow.

The plant-engaging instrumentalities of the machine include, in addition to the drums 8 and pegs 19 thereon, a transverse axis, rotary top roller 21 disposed above the soil bed 3 a distance such that said roller runs in engagement with the mat of plants.

The rotary top roller 21 includes enlarged, outwardly flared ends 22 whose outer edges are each disposed in a longitudinal vertical plane which extends close to the laterally inner side of the adjacent drum 8. More particularly, the horizontal axis of the top roller 21 is disposed in rearwardly offset relation to the vertical axes of said drums 8 to an extent such that the leading portion of each flared end 22 occupies a working position quite close to but spaced from the laterally inner side of the corresponding drum 8 at a point only slightly to the rear of the central transverse plane thereof.

The rotary top roller 21 includes telescopic cylindrical sections 23 and 24 which permit such top roller to be adjusted to vary its overall length and as dictated by the spacing to which the drums 8 are set for any particular soil bed 3; said top roller being mounted in connection with the tool bar 1, in both vertically and laterally adjustable relation, as follows:

A standard 25 upstands at each end of the top roller 21 and is secured at the upper end to the tool bar 1 by a clamp 26;

there being a horizontal spindle 27 fixed on and projecting laterally inwardly from the lower end of such standard 25. Each spindle 27 is journaled in a bearing 28 secured to an attachment disc 29 fixed in the related end portion of said top roller.

With the rotary top roller 21 constructed and mounted as above described, it is driven and turns rearwardly at the bottom, by engagement with the plants 4, as the machine advances along the soil bed 3; the rotating flared ends 22 of such top roller aiding in the press-tucking of the runners 7, as swept onto the soil bed as aforesaid, into the mat of plants 4 on said soil bed 3. Additionally, such top roller 21 is vertically adjusted to a position such that it rides on the plants to an extent sufficient to impose a substantial compacting force on the mat thereof and which includes the runners as swept onto the soil bed and press tucked into said mat.

While the plant trainer is herein shown and described as mounted on a tractor, the device can, of course, be used in connection with a tractor-drawn sled or the like.

From the foregoing description, it will be readily seen that there has been produced such a row crop plant trainer as substantially fulfills the objects of the invention, as set forth herein.

We claim:

1. A plant trainer, for a row crop of plants on a longitudinal soil bed having irrigation furrows at the sides thereof, comprising a pair of upstanding, transversely spaced, ground-driven rotary drums disposed with laterally inner parts only overhanging corresponding shoulders of the soil bed, means mounting the rotary drums for advance lengthwise of the soil bed and with the lower ends of the drums adjacent the horizontal plane of the top of said soil bed, a transverse-axis rotary top roller spanning between the drums in spaced relation above the top of the soil bed, means mounting said top roller for advance, in unitary relation, with the drums lengthwise of said soil bed, and a multiplicity of circumferentially spaced pegs projecting downwardly from the lower end of each drum adjacent the periphery thereof; the pegs projecting downwardly below the horizontal plane of the top of the soil bed whereby the pegs on said laterally inner parts of the drums penetrate the soil of said bed and cause rotation of such drums, as the latter advance, in directions toward each other at the front; the plant runners which grow into the furrows being engaged by the downwardly projecting pegs at the front of the advancing and rotating drums and being swept by such pegs and drums onto the soil bed whence said runners are press-tucked by said drums into the plants on such bed, and the plants on said bed passing beneath and being compacted by the top roller upon advance thereof.

2. A plant trainer, as in claim 1, in which the mounting means for the drums provides for adjustment of the transverse spacing thereof; the top roller including axially telescopic sections, and the mounting means for such top roller providing for axial adjustment of said sections whereby to alter the overall length of said top roller.

3. A plant trainer, as in claim 1, in which the rotary top roller includes outwardly flared ends; the outer periphery of such flared ends running close to the corresponding drums.

4. A plant trainer, as in claim 1, in which the mounting means for both the drums and the top roller provide for lateral and vertical adjustment thereof, selectively and independently; the top roller being adjustable to alter the overall length thereof.